Sept. 6, 1966      E. W. GOSSWILLER      3,271,735
WARNING DEVICE FOR EMERGENCY VEHICLES
Filed June 29, 1964      2 Sheets-Sheet 1
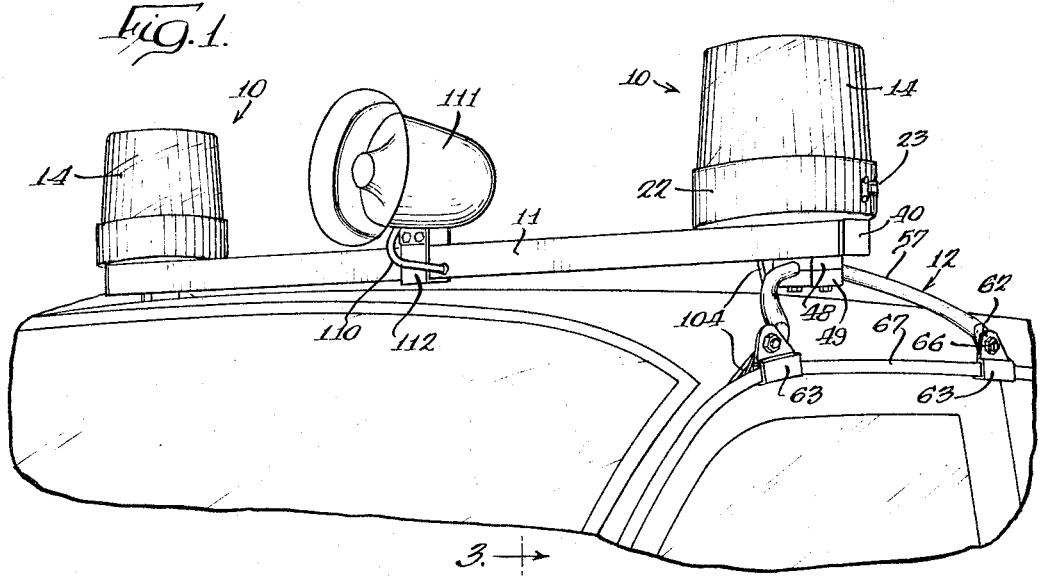
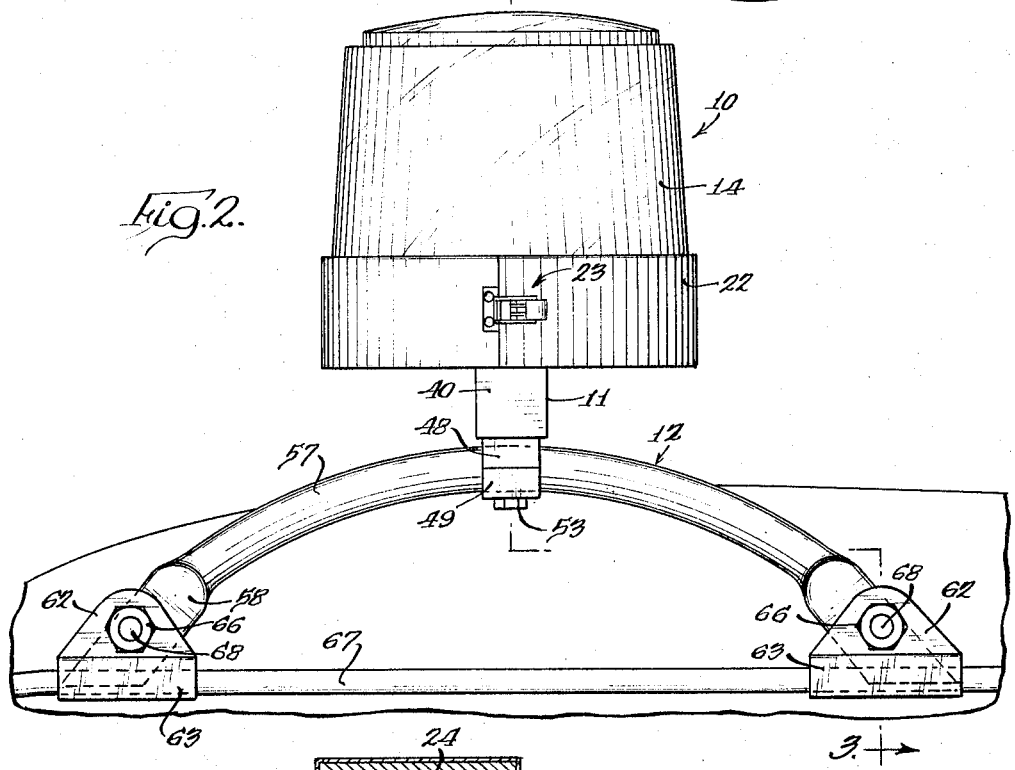
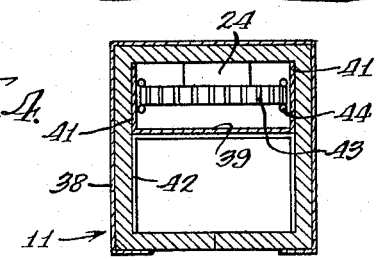
INVENTOR.
Earl W. Gosswiller
BY
Gary, Parker, Juettner & Cullinan
Attys Sept. 6, 1966 E. W. GOSSWILLER 3,271,735
WARNING DEVICE FOR EMERGENCY VEHICLES
Filed June 29, 1964 2 Sheets-Sheet 2

INVENTOR.
Earl W. Gosswiller
BY
Gary, Parker, Juettner & Cullinan
Attys

United States Patent Office 3,271,735
Patented Sept. 6, 1966

1

3,271,735
WARNING DEVICE FOR EMERGENCY VEHICLES
Earl W. Gosswiller, Chicago, Ill., assignor to Federal Sign and Signal Corporation, Blue Island, Ill., a corporation of New York
Filed June 29, 1964, Ser. No. 378,754
10 Claims. (Cl. 340—50)

The present invention relates to warning devices for emergency vehicles, and is particularly concerned with improved rotating signal lights of the type used on police and fire department vehicles and on other emergency vehicles.

It is an object of the invention to provide a light signalling apparatus for the described character which is of simple and economical construction and which is adapted to be secured readily to the roof of the vehicle on which it is to be used.

Another object of the invention is to provide a light signalling apparatus for the foregoing description which includes attaching means for securing the apparatus to a vehicle roof, which attaching means is universally adjustable relative to the vehicle roof whereby the signalling apparatus may be easily and detachably secured to vehicle roofs of a wire variety of conformations.

An additional object is to provide a light signalling apparatus which employs a pair of rotatable lamp assemblies spaced transversely of the vehicle and including a single driving means for rotating both of said lamp supports in unison, but in out-of-phase relationship, whereby to afford flashing signals alternating from one side of the vehicle to the other.

A further object is to provide a lamp holder of simple and inexpensive construction having an exterior configuration enabling several of such lamp holders to be secured together to form a unitary lamp supporting assembly suitable for coupling with means for rotating such assembly.

A still further object is to provide a lamp holder of the character described which is adapted to accommodate a sealed beam lamp, and is further provided with simple means for expeditiously detachably securing the latter in the lamp holder, and with spring contact means for engaging the contacts of the lamp enabling the lamp to be quickly and easily removed from the lamp holder without the necessity of disconnecting any electrical wires or unfastening any threaded mechanical connections.

Other objects and advantages will become apparent from the following detailed description of a preferred embodiment of the invention.

Now, in order to acquaint those skilled in the art with the manner of making and using my improved signal or warning apparatus, I shall describe, in connection with the accompanying drawings, a preferred embodiment of said apparatus and the preferred manners of making and using the same.

In the drawings:

FIGURE 1 is a perspective view illustrating a preferred embodiment of the warning apparatus provided in accordance with the invention and showing the same attached to the roof of an automobile;

FIGURE 2 is an end elevation of the apparatus shown in FIGURE 1;

FIGURE 4 is a cross-section of the signal support taken substantially on line 4—4 of FIGURE 3.

Figure 3:
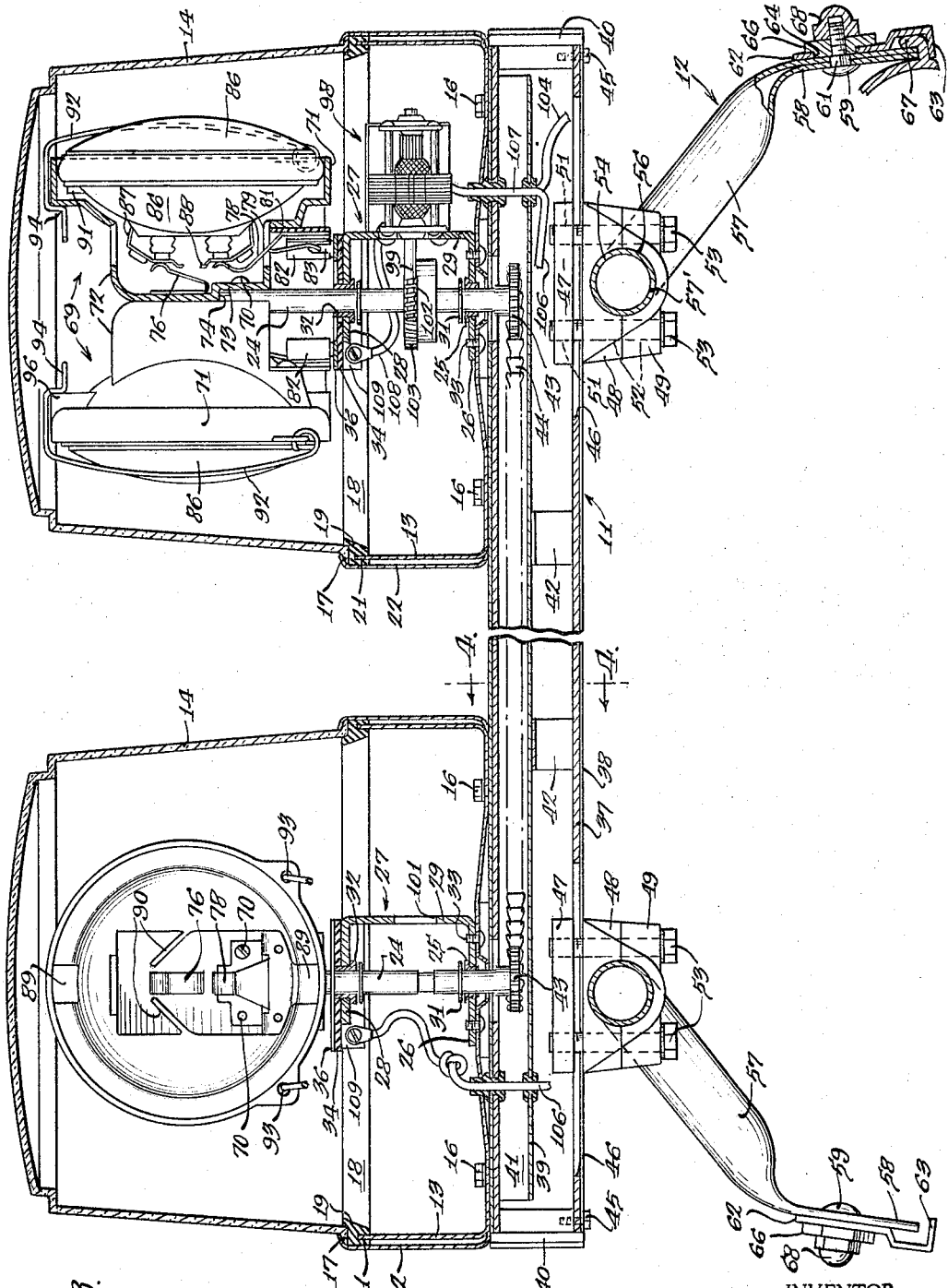
FIGURE 3 is a vertical longitudinal section of the apparatus taken substantially on line 3—3 of FIGURE 2.

Referring now to the drawings, wherein like reference numerals indicate like parts, the apparatus there depicted comprises a pair of spaced light housings, each indicated generally at 10, carried by a support member generally indicated at 11. The support member extends transversely of the vehicle roof and is supported adjacent its ends by bracket members, indicated at 12. The housings 10 and their contained lights and rotatable mountings are identical, and therefore a description of one will suffice as a description for both, the composite view of the two in FIGURE 3 effectively affording vertical sections at right angles due to the phase relationship of the lights in the two units.

The housing 10 comprises a pan-shaped base member 13 and a light transmitting dome 14, the latter being preferably formed or molded of rigid, clear or colored transparent or transluscent material, preferably plastic, so that the light emitted is the color desired for the intended use of the apparatus.

The base member 13 is secured to the support 11 by any convenient means, such as tap-or screw-bolts 16. The dome 14 forms a closure for the base 13, and is provided at its bottom with an outwardly directed annular flange 17 which rests on an annular gasket 18 of rubber or other suitable material, the gasket having a substantially longitudinally directed annular flange 19 which is adapted to contact for a short distance the inner wall of the dome 14 adjacent its open end when the lamp housing is completely assembled. The gasket 18 is also provided with a downwardly open annular slot 21 which receives the upper edge of the base member 13 for further sealing the joint between the base member 13 and the dome 14.

A detachable bezel or collar 22 engages the flange 17 of the dome and the lower edge of the base member 13, as shown, whereby the dome and base member are secured together in firmly sealed, weather-tight relation. The bezel is in the form of a split ring, and is provided at its ends with the respective parts of a toggle-type suitcase clamp 23 (FIGURE 2). The clamp facilitates rapid detachment of the bezel and the dome 14 from the base 13, and also serves as means for conveniently and quickly drawing the ends of the bezel together in securing the dome 14 and the base member 13 together in sealed relation against the gasket 18, as shown in FIGURE 3.

Each of the housings 10 is provided internally with a vertical rotatable shaft 24 and a generally C-shaped supporting bracket 27 therefor. The bracket includes vertically spaced lower and upper horizontal flanges 26 and 28 and a vertical connecting web 29. The shaft 24 is journalled for rotation in a thrust bearing 25 mounted on the lower flange 26 and a second bearing 32 supported in the upper flange 28. A collar or ring 31 (such as a C-ring) adjacent the lower end of the shaft supports the same on the bearing 25. Tap- or screw-bolts 33 secure the lower flange 26, and thus the supporting bracket 27, to the bottom of the base member 13.

A plate 34 of electrical insulating material is secured to the top of the flange 28, and a conductive disc or plate 36 having circular central opening therein of larger diameter than that of bearing 32 is fixed to the insulating plate 34 in such manner that the conductor 36 is insulated from the bracket 27, the shaft 24 and the bearings 25 and 32.

The shaft 24 extends upwardly through the bearing 32 and the plates 34 and 36 and at its upper end carries a plurality of lamp holders 69, which are preferably two in number in the illustrated embodiment. The lamp holders and their associated parts are identical, and accordingly a description of one will suffice. Each lampholder 69 comprises a generally concave cast metal housing 71 having a rearwardly extending hollow boss 72.

The major area of the external rearward face of the boss 72 is substantially planar and generally perpendicular to the axis of the housing concavity; i.e., the optical axis of the lampholder. At its lower central portion, the external rearward face of the boss is provided with a vertical groove 73 of a radius equal to that of the shaft 24 and slightly less than semi-cylindrical in extent, the groove having an upper end wall 74. It will thus be seen that when two lampholders are secured together in back-toback relation, as by means of screws 70, the opposed grooves 73 therein form a generally cylindrical recess of limited height for reception of the upper end portion of the shaft 24. The complementary end walls 74 are provided to locate the lampholders automatically at the proper elevation or operating height relative to the dome 14, and the two grooves are slightly less than semi-cylindrical so that the bolts 70, upon tightening, mutually clamp the two holders fixedly to the shaft for conjoint rotation therewith.

The described construction greatly facilitates mass production and assembly of the units in that the two lamp holders 69, upon interconnection by just two bolts 70, are automatically positioned on the shaft 24 and fixedly clamped thereto. Moreover, the lamp holders are identical in all respects so that there is no need for selection of, say, right and left-hand units to make the assembly, but any two holders may be readily assembled to form the described dual lamp holder means. Note from the left-hand unit in FIGURE 3, for example, that even the two holes for the bolts 70 are respectively bored and tapped so that two identical holders are quickly assembled by inserting one bolt 70 (the right-hand one) from one side of the assembly and the other from the other side thereof.

Within the interior of each holder, a spring metal contact 76 is fixed directly to the inner surface of the rearward wall of the boss 72, and thereby grounded. A second spring metal contact 78, positioned below the contact 76 and in vertical alignment therewith, projects freely through an opening 79 in the lower part of the boss 72 and is secured to a plate 81 of electrical insulating material, the latter being fixed in any suitable manner to a rearwardly facing portion of the lampholder housing. A conventional brush holder 82 is also fastened to the insulating plate 81, the brush holder opening downwardly and containing a brush contact 83 which is electrically connected to the spring contact 78. The brush 83 is biased outwardly of the brush holder in conventional manner, and thus is brought into pressure contact with the upper surface of the conductive disc or plate 36 previously described. This plate in turn is connected, as by lead 108, to any suitable source of electric power, which in the case of a vehicle is the "hot" side of the vehicle's D.C. electrical system.

The major diameter of the concave portion 71 of the lampholder is chosen to accommodate a conventional sealed beam lamp 86 having external electrical terminals 87 and 88. The inner wall of the lampholder is notched at its upper and lower extremities, as at 89, to receive the locator lug 91 conventionally formed on sealed beam lamps. Webs 90, cast integrally with the rearward wall and adjacent side walls of the boss 72, cooperate with the lamp terminals to compel vertical alignment of said terminals with the contacts 76, 78 of the lampholder. Thus when the lamp is placed in the lampholder, the terminals 87, 88 of the lamp are automatically guided into alignment and engagement with the contact 76, 78 of the lampholder.

A spring clip 92 is provided for holding the lamp 86 firmly in the lampholder, but permitting quick release of the lamp for replacement. The clip 92 is composed of a piece of spring wire, the ends of which are hooked in openings 93 formed at the opposite sides and adjacent the bottom of the front portion of the lampholder. The center portion of the spring wire is of inverted substantially V-shape, the portion adjacent the apex of the V being formed with a rearwardly extending hook 94 adapted to catch resiliently on the upper rear edge 96 of the front portion of the lampholder housing.

The particular combination of elements described greatly facilitates replacement of burned-out lamps. Specifically, the bezel clamp 23 may be quickly snapped open to cause expansion of the bezel ring 22 to release the latter from the flange of the dome 14, whereupon the dome may be removed from the base to expose the lamps.

The spring clip 92 is then flipped open to release the burned-out lamp from its holder, the spring contacts 76, 78 pushing the lamp out of the holder. A new lamp may then be inserted, the webs 90 automatically insuring alignment and engagement of the lamp terminals 87, 88 with the contacts 76, 78. Note that it makes no difference whether the lamp be inserted with the terminal 87 uppermost or the terminal 88 uppermost, so that no particular caution is required in inserting the new lamp. The spring clip 92 is then swung upwardly and its hook 94 snapped over the top portion 96 of the holder to lock the lamp in place. The spring contacts 76, 78 bias the lamp into snug engagement with the clip while maintaining electrical contact with the lamp terminals. The dome and bezel ring may then be replaced, whereby the entire procedure may be carried out in just a few seconds without need for any tools.

To the extent thus far described, the two units 10 are identical. The right-hand unit in FIGURE 3 differs from the left-hand unit in that an electric motor 98 is secured to the outboard side of the connecting web 29 of the bracket 27 therein, the shaft 99 of the motor extending horizontally through an opening 101 in the web to a position adjacent but spaced to one side of the respective shaft 24. At its end, the motor shaft 99 carries a worm 102 which meshes with a worm wheel 103 secured to said shaft 24, whereby to effect rotation of the shaft at a preselected speed determined by appropriate selection of the motor and appropriate design of the gear drive 102–103.

For a vehicle signal light, the motor 98 is a D.C. motor of a voltage characteristic corresponding to that of the vehicle's electrical system, e.g., 12 volts, and of a power adequate to drive one, two or more of the units 10. If only one signal device is required, the shaft 24 of the right-hand unit shown in FIGURE 3 may be terminated just below the bearing 25 and above the base 13 to provide a unitary, self-contained emergency light. If two or more signal devices are desired, as illustrated herein, the shaft 24 is extended below the base and coupled to the additional devices or units by chain and sprocket means, thereby to eliminate the need for more than one electric motor and also to assure positive synchronization of the multiple signals.

Specifically, the support bar 11 for the two illustrated units 10 is preferably of tubular construction, and in its preferred embodiment is illustrated as a square metallic tube. For aesthetic purposes, the tube is covered with a thin sheet 38 of stainless steel or other corrosion resistant and/or decoratively plated material. The tubular member 11 is preferably provided with a horizontal partition 39 which may conveniently comprise the web of a channel member having upstanding flanges 41, although the latter are not essential as will appear hereinafter. The partition 39 is supported above the floor of the tubular member 11 by several inverted U-shaped support members 42. The ends of the tubular member 11 are closed by plug portions 40 secured in position by set screws 45.

The lower end of each shaft 24 extends through an opening in the upper wall of the support member 11 and into the interior thereof, and carries at its lower end a sprocket 43, the sprocket being fast on the shaft 24. An endless chain 44 is passed around both sprockets 43 in the twin assembly illustrated in FIGURE 3, engaging the teeth thereof, and the sprockets are preferably of the same diameter, so that rotation of the right-hand shaft 24 results in rotation of the left-hand shaft 24, and at the same speed.

The partition 39 is preferably disposed in close proximity to the sprockets 43, and in such position provides support for any sagging portions of the chain between the sprockets. Grease for lubricating the chain and sprockets is preferably applied generously to the top of the partition 39, the grease being picked up and distributed to the sprockets by the moving chain in normal operation of the signal lights. As shown in FIGURE 4, the width of the tubular support member 11 (or the distance between the webs 41 of the partition 39) is only slightly larger than the diameter of the sprockets 43, and this dimensional relationship effectively prevents the chain 44 from slipping off or otherwise becoming disengaged from the sprocket teeth.

In the illustrated embodiment of the invention, wherein two units each containing two lamps are disposed at opposite ends of the bar 11, it is desirable to have the lamps so synchronized that the flashes produced by rotation of the lamps of one unit are alternated with the flashes produced by the other unit to give the effect of lights flashing in alternation from one side to the other of the vehicle. For this purpose, the lamp holders 69 of the left-hand unit are preferably disposed 90 degrees out-of-phase from the lamp holders of the right-hand unit, as shown in FIGURE 3. This may be accomplished by appropriate positioning before the chain is assembled on the sprockets, or by loosening the screws or bolts 70, rotating the lamp holders on the shaft 24 to the selected position and tightening said bolts. Obviously, the latter capability of the described structure facilitates any desired relative adjustment of the lamps.

Also, the ease with which the lamp holders are removed from and reassembled on the shaft 24 facilitates replacement of the brushes 83, and the only tool required for this repair is a screw driver.

Electric current for the motor 98 and the lamps 86 is derived from any suitable source, such as the battery of the vehicle on which the units are mounted. A single conductor 104 may conveniently and unobstrusively be laid in the rain gutter of the vehicle, as indicated in FIGURE 1, and led into the interior of the tubular bar 11 where it is divided into two conductors 106 and 107. The conductor 107 is connected to one of the leads (not shown) of the motor 98 (the other lead being grounded), and a jumper 108 is connected between the one motor lead and a depending flange 109 on the copper plate 36. Electric current is conveyed to the lamps 86 from the copper plate 36 through the brushes 83 and contact pairs 78–88. Branch conductor 106 extends to the companion light housing of the pair shown in FIGURE 3, passes into the housing through suitable grommets, and is connected directly to the flange 109 of the copper plate 36, whereby to supply current to the left-hand lamps 86. Conductors 104, 106 and 107 enter the housing and are disposed in most part below the partition 39, the leads 106 and 107 extending upwardly at the outer sides of the sprockets 43, whereby the conductors are physically separated from the mechanical drive components and are protected from damage. Similarly, an electrical conductor 110 (FIGURE 1) for an accessory appliance may be lead into one end of the tubular bar 11 beneath the partition 39 and conducted outwardly through the front, rear or bottom wall of the bar to provide a concealed power supply completely shielded from the mechanical components of the two light units.

A further advantage of the bar construction afforded by this invention is the facility with which accessory equipment can be associated with the two alternately flashing lights. For example, an illuminated sign identifying the emergency vehicle (e.g., "Police," "Fire," "Ambulance") can readily be clamped to the bar between the lights, as can sirens, horns and other warning devices. In FIGURE 1, I have shown, by way of example, the speaker 111 of a combined electronic siren and public address system clamped centrally on the bar by a simple U-shaped clamping bracket 112. Thus, a complete emergency warning system can conveniently and economically be provided on a vehicle by use of a single transverse mounting bar 11.

To mount the bar 11 quickly and conveniently on a vehicle, the present invention further provides an improved bar mounting bracket 12 having capabilities not heretofore realized in the art and affording means for expeditious mounting without requiring any modification to the vehicle, and especially without requiring the drilling of holes in the roof as has heretofore been conventional.

Referring particularly to FIGURES 2 and 3, the lower wall of the tubular support bar 11 is provided adjacent its ends with a pair of slots 46 by which clamping members 47 are associated with the bar for adjustment longitudinally of the bar and for mounting the brackets 12 on the bar. Since the clamping members and their associated brackets are identical, a description of one will suffice for both. Each clamping member comprises a plate portion 47, and a pair of clamping jaw portions 48 and 49. The plate 47 slidably engages the inner surface of the lower wall of the support member 11 along the sides of the slot 46, and the jaw portion 48 overlaps the outer wall. The plate 47 is provided with tapped holes 51, and the jaw portions 48 and 49 are bored, for reception of lock bolts 53 which pass loosely through the bores 52 and are threaded into the tapped holes 51. Each of the jaw portions 48 and 49 is formed with a substantially semi-cylindrical groove indicated at 54 and 56, which complement each other to form a cylindrical clamping surface.

The bracket member 12 comprises a generally arcuate tubular member 57 which is of substantially circular cross-section at least at its central portion and is received within the clamping grooves 54 and 56, the same having an outside diameter at least as large as the diameter of the cylinder defined by said grooves.

The tubular member 57 is flattened at each end thereof, as indicated at 58. A stove bolt 59, having a square shank 61, extends through a square opening in each of the flattened portions 58, whereby rotation of the bolt relative to the bracket is prevented. A plate member 62 having a depending hook portion 63 and a circular opening 64 of larger diameter than the threaded portion of the bolt 59 is disposed against the outer surface of each of the flattened portions 58, and a rotary cam 66 having an eccentric circular hub is mounted on each bolt 59. Preferably, the cam comprises a nut threaded on the bolt. The diameter of the opening 64 and the diameter of the hub of the cam 66 are such that the plate 62 fits snugly but movably over the hub, and the thickness of the plate 62 is greater than the length of the hub of the cam. As is apparent from FIGURE 3, the camming of the eccentric hub in the circular opening of the plate permits the space between the end of the flattened portion 58 and the hook portion 63 to be opened sufficiently to permit the portion 58 to fit within and the hook portion 63 to engage around the conventional drain gutter 67 of an automobile top, and that such camming action may be used to move the hook portion 63 into clamping engagement with the gutter, whereby each end of the member 57 may be tightly and adjustably secured to the drain gutter of the automobile top. Preferably, the outer flange of the cam is of hexagonal or like form to facilitate adjustment thereof. A lock nut 68 is provided on the outer end of each bolt 59 to secure the respective cam 66 in its desired position.

With the various adjustments provided in the brackets and clamping members, the support member 11 is rendered universially adjustable relative to automobile roofs. Inasmuch as the bolts 53 provide the clamping force between the plate portion 47 and the clamping jaw 48, and between the clamping jaws 48 and 49, it is evident that by loosening the bolts 53 the two clamping assemblies may be moved longitudinally of the bar, i.e., transversely of the vehicle, thereby to accommodate the assembly to vehicles of different widths—from compact cars to fire trucks. Also, with the bolts 53 relatively loose, the arcuate members may be rotated about the axis of the clamping jaw openings 54–56 to adjust the assembly to the roof contour, i.e., the crown or height of the roof relative to its rain gutters. Simultaneously, the tubular members 57 may be moved backward and forward in the jaw members, i.e., longitudinally of the vehicle, to adjust the same to the front to rear contour of the roof or the rain gutters. For example, if the rain gutter 67 in FIGURE 2 sloped downwardly to the left rather than being level as shown, the lights 10 would be tilted toward the front rather than remaining upright. To cure such condition, all that would be required would be to relatively shift the bar and its clamps 48–49 rearwardly on the tubular members until the lights were again upright. Also, by loosening the gripping hooks 63 from the drain gutter 67 by manipulation of the cam 66, the support member 11 may be moved longitudinally of the gutters, i.e., fore and aft relative to the vehicle. These adjustable features permit the signal lights to be adapted to a wide variety of vehicles having a variety of roof contours, and, in addition, permit the signal lights to be secured to substantially any vehicle roof in the most desirable position from the standpoint of appearance and effectiveness of operation. When so located, the unit may be clamped in position simply by tightening the nut and the bolts 53.

From the foregoing, it will be evident that the signal light units of the invention provide a number of important features of economy and resulting in simplicity of construction, assembly and repair. The quick-release features of each unit particularly facilitate quick and effortless replacement of the lamps. The unit is devised to readily accommodate formation of single and multiple light assemblies and also to facilitate complete emergency warning systems. Also, the support bar 11 allows the apparatus to be adapted easily to vehicles of widely varying sizes and roof conformations. Thus, the objects and advantages of the invention have been shown to be attained in an expedient, economical and practical manner.

While I have shown and described what I regard to be the preferred embodiment of my invention, it will be appreciated that various changes, rearrangements and modifications may be made therein without departing from the scope of the invention, as defined by the appended claims.

I claim:

1. Signal light means for mounting on the roofs of emergency vehicles, comprising a hollow bar extending transversely of the roof and having longitudinal slots therein adjacent its ends; clamping jaw means slidably mounted in each slot for adjustment transversely of the roof; each jaw means including adjustable portions defining an opening transversely of said bar; a curved bracket slidably and rotatably mounted in the opening of each jaw means, means detachably clamping each jaw means to the respective bracket and said bar; each bracket including end portions extending to opposite sides of and below said bar and into the adjacent drain gutter of the roof; hook means on each end of each bracket clamped about the exterior of the gutters; similar signal lights mounted adjacent the ends of said bar; each light comprising a base, a light transmitting dome over the base, a bracket secured to the base beneath said dome, a shaft journalled on said bracket and extending upwardly into the dome and downwardly into said bar, sprocket means on the lower end of said shaft fitting conformably within said bar, a plurality of diversely facing lamp holders within the dome each having a rearward face generally paralleling the shaft and a recess in its rearward face parallel to the shaft, each recess opening from the bottom of the holder and terminating in a transverse wall at its upper end; said recesses upon abutment of said rearward faces defining a bore generally complementary to and receiving the upper end of said shaft, said transverse walls automatically positioning said holders at the proper elevation on the shaft, and fasteners extending between said rearward faces and clamping said holders to one another and the shaft; each holder comprising a concave housing, spring contacts at the base of the concavity, a lamp removably disposed in the concavity and having a pair of external terminals engaging said contacts, and a wire retainer pivoted to said housing at one side of the lamp, extending across the face of the lamp and resiliently hooked to the housing at the opposite side of the lamp to hold the lamp in the housing with its terminals in resilient engagement with said contacts; each light including a split-ring bezel for detachably securing the dome to the base and a quick-release catch on said bezel for drawing the same into and releasing it from clamping engagement with the base and the dome; said catch being releasable to release the dome from the base to accommodate access to the lamps, said retainers being releasable from the respective housings for releasing said lamps for rapid replacement, and said fasteners being releasable for facilitating adjustment of the lamp holders relative to the respective shaft; an electric motor in one of said lights drivingly connected to the shaft therein; chain means within said bar reaved over said sprocket means for imparting the movements of the motor driven shaft to the other of said shafts; a partition within said bar below said sprocket means for supporting said chain means; and electric power supply cords extending through said bar below said partition and upwardly through the bases of said lights outwardly of said sprocket means for supplying power to the lamps in each light and the motor in the said one light.

2. Signal light means comprising a hollow bar; a pair of signal lights mounted adjacent the ends of said bar; each light comprising a base, a light transmitting dome over the base, a bracket secured to the base beneath said dome, a shaft journalled on said bracket and extending upwardly into the dome and downwardly into said bar, a conductor on top of said bracket encircling said shaft, sprocket means on the lower end of said shaft fitting conformably within said bar, a plurality of diversely facing lamp holders within the dome each having a rearward face generally paralleling the shaft and a recess in its rearward face parallel to the shaft, each recess opening from the bottom of the holder and terminating in a transverse wall at its upper end; said recesses upon abutment of said rearward faces defining a bore generally complementary to and receiving the upper end of said shaft, said transverse walls automatically positioning said holders at the proper elevation on the shaft, and fasteners extending between said rearward faces and clamping said holders to one another and the shaft; each holder comprising a concave housing, spring contacts at the base of the concavity, a brush connected to said contacts and depending from said housing and slidably engaging the respective conductor, a lamp removably disposed in the concavity and having external terminals engaging said contacts, and a wire retainer pivoted to said housing at one side of the lamp, extending across the face of the lamp and resiliently hooked to the housing at the opposite side of the lamp to hold the lamp in the housing with its terminals in resilient engagement with said contacts; each light including a split-ring bezel for detachably securing the dome to the base and a quick-release catch on said bezel for drawing the same into and releasing it from clamping engagement with the base and dome; said catch being releasable to release the dome from the base to accommodate access to the lamps, said retainers being releasable from the respective housings for releasing said lamps for rapid replacement, and said fasteners being releasable for facilitating adjustment of the lamp holders relative to the respective shaft; an electric motor in one of said lights drivingly connected to the shaft therein; chain means within said bar reaved over said sprocket means for imparting the movements of the motor driven shaft to the other of said shafts; a partition within said bar below said sprocket means for supporting said chain means; and electric power supply cords extending through said bar below said partition and upwardly through the bases of said lights outwardly of said sprocket for supplying power to the conductor in each light and the motor in said one light.

3. Signal light means comprising a hollow bar; a pair of signal lights mounted adjacent the ends of said bar; each light comprising a base, a light transmitting dome over the base, a bracket secured to the base beneath said dome, a shaft journalled on said bracket and extending upwardly into the dome and downwardly into said bar, sprocket means on the lower end of said shaft fitting conformably within said bar, a plurality of diversity facing lamp holders within the dome each having a rearward face generally paralleling the shaft and a recess in its rearward face parallel to the shaft, each recess opening from the bottom of the holder and terminating in a transverse wall at its upper end; said recesses upon abutment of said rearward faces defining a bore generally complementary to and receiving the upper end of said shaft, said transverse walls automatically positioning said holders at the proper elevation on the shaft, and fasteners extending between said rearward faces and clamping said holders to one another and the shaft; each holder comprising a concave housing, of a pair of spring contacts at the base of the concavity, a lamp removably disposed in the concavity and having a pair of external terminals engaging said contacts, and a wire retainer pivoted to said housing at one side of the lamp, extending across the face of the lamp and resiliently hooked to the housing at the opposite side of the lamp to hold the lamp in the housing with its terminals in resilient engagement with said contacts; each light including a split-ring bezel for detachably securing the dome to the base and a quick-release catch on said bezel for drawing the same into and releasing it from clamping engagement with the base and the dome; said catch being releasable to release the dome from the base to accommodate access to the lamps, said retainers being releasable from the respective housings for releasing said lamps for rapid replacement, and said fasteners being releasable for facilitating adjustment of the lamp holders relative to the respective shaft; motor means in one of said lights drivingly connected to the shaft therein; chain means within said bar reaved over said sprocket means for imparting the movements of the motor drive shaft to the other of said shafts; a partition within said bar below said sprocket means for supporting said chain means; and power supply means extending through said bar below said partition and upwardly through the bases of said lights outwardly of said sprocket means for supplying power to the lamps in each light and the motor in the said one light.

4. A signal light comprising a base, a light transmitting dome on the base, a split ring bezel for detachably securing the dome to the base, a quick-release catch on said bezel for drawing the same into clamping engagement with the base and the dome for quickly releasing the dome from the base, a bracket secured to the central portion of said base beneath said dome, a shaft journalled on said bracket and extending upwardly into the dome, an upwardly exposed conductor mounted on said bracket and encircling said shaft, a plurality of diversely facing lamp holders within said dome, each holder comprising a generally concave housing having a rearward face generally perpendicular to the axis of its concavity and generally parallel to the shaft, a recess in the rearward face of each housing parallel to the shaft, each recess opening from the bottom of the holder and terminating in a transverse wall at the upper end thereof, said recesses upon abutment of said rearward faces of said housing defining a bore complementary to and receiving the shaft, said transverse walls automatically positioning said holders at the proper elevation relative to the shaft and the dome, fasteners extending between the rearward faces of said housings for clamping said housings to one another and the shaft for conjoint movement with the shaft, a contact brush depending from each housing and slidably engaging said conductor concentrically of said shaft, spring contact means within each housing at the base of the concavity thereof and electrically coupled to the contact brush carried by the respective housing, a lamp removably disposed in the concavity of each housing and having external terminal means engaging said contact means, and a lamp retainer associated with each housing, each retainer being pivotally attached at one end to the respective housing at one side of the lamp therein and including an intermediate portion extending across the face of the lamp and a free end having a hooked portion resiliently interengaged with the respective housing at the opposite side of the lamp, said intermediate portion of each retainer holding the respective lamp in the respective housing with the terminal means thereof in resilient engagement with the respective contact means, said catch being releasable to release the dome from the base and the hook portions of said retainers being releasable from the respective housings for releasing the respective lamps for rapid replacement and for facile access to said fasteners to accommodate adjustment of said housings relative to the shaft and replacement of said contact brushes.

5. In a signal light having a base, a light transmitting dome on the base, a shaft journalled on the base and extending upwardly into the dome and lamp means on the shaft within the dome: said lamp means comprising a plurality of diversely facing lamp holders; each holder comprising a generally concave housing having a rearward face transverse to the axis of the concavity and generally parallel to the shaft, a recess in said rearward face parallel to the shaft, the recess opening from the bottom of the holder and terminating in a transverse wall at the upper end of the recess, electrical contacts within the housing at the base of its concavity, a lamp removably disposed in the concavity and having external terminals engaging said contacts, and a wire retainer pivotally attached at one end to the housing at one side of the lamp and including an intermediate portion extending across the face of the lamp and a free end having a hook portion resiliently interengaged with the housing at the opposite side of the lamp, said intermediate portion of the retainer holding the lamp in the housing and the terminals of the lamp in resilient engagement with said contacts, each retainer upon disengagement of its hook portion from the housing releasing the respective lamp for replacement; said housings being detachably secured together with the rearward faces thereof in contiguous relation and said recesses in registry to form a bore generally complementary to and receiving the shaft, said transverse walls automatically positioning said holders at the proper elevation relative to one another, the shaft and the dome.

6. In a signal light having a base, a light transmitting dome on the base, a shaft journalled on the base and extending upwardly into the dome and lamp means on the shaft within the dome, the improvement comprising a plurality of diversely facing lamp holders within the dome each having a rearward face generally paralleling the shaft, a recess in the rearward face of each holder parallel to the shaft, each recess opening from the bottom of the holder and terminating in a transverse wall at the upper end thereof, said recesses upon abutment of said rearward faces of said holders defining a bore generally complementary to and receiving the shaft, said transverse walls automatically positioning said holders at the proper elevation relative to the shaft and the dome, and fasteners extending between the rearward faces of said holders for clamping said holders to one another and the shaft for conjoint movement with the shaft.

7. Signal light means comprising an elongate hollow mounting bar; a pair of signal lights mounted adjacent the opposite ends of said bar; each light comprising a base, a light transmitting dome on the base, a shaft journalled on the base and extending upwardly into the dome and downwardly into said bar, lamp means on the upper end portion of said shaft within said dome, and sprocket means on the lower end portion of said shaft within said bar; a motor in one of said lights drivingly connected to the shaft therein; a partition within said bar immediately below and extending between said sprocket means; chain means in said bar above said partition reaved over said sprocket means for imparting the movements of the motor driven shaft to the other of said shafts; said bar fitting closely about said sprocket means whereby said bar and said partition prevent disassociation of said chain means from said sprocket means; and power supply means for said lamp means and said motor extending through said bar below said partition.

8. Signal light means comprising an elongate hollow mounting bar; a pair of substantially identical signal lights mounted adjacent the ends of said bar; each light comprising a base, a light transmitting dome on the base, a shaft journalled on the base and extending upwardly into the dome and downwardly into said bar, sprocket means on the lower end portion of said shaft within said bar, a plurality of diversely facing lamp holders within the dome each having a rearward face generally paralleling the shaft, a recess in the rearward face of each holder parallel to the shaft, each recess opening from the bottom of the holder and terminating in a transverse wall at the upper end thereof; said recesses upon abutment of said rearward faces of said holders defining a bore complementary to and receiving the shaft, said transverse walls automatically positioning said holders at the proper elevation relative to one another, the shaft and the dome; fasteners extending between the rearward faces of said holders for clamping said holders to one another and the shaft for conjoint movement with the shaft; a motor in one of said lights drivingly connected to the shaft therein; a partition within said bar immediately below and extending between said sprocket means; chain means in said bar above said partition and reaved over said sprocket means for imparting the movements of the motor driven shaft to the other of said shafts; said bar fitting closely about said sprocket means whereby said bar and said partition prevent disassociation of said chain means from said sprocket means; and power supply means for said lamp means and said motor extending through said bar below said partition; said fasteners facilitating adjustment of the lamp holders of each light relative to the lamp holders of the other light to accommodate adjustment of the phase relationship between the lamp holders of the two lights.

9. Signal light means for mounting on the roofs of emergency vehicles, comprising an elongate hollow mounting bar extending transversely of the vehicle roof and having slots adjacent its ends extending longitudinally of the bar, clamping jaw means slidably mounted in each of said slots for adjustment transversely of the roof, each jaw means including relatively adjustable portions defining an opening transversely of said bar, a curved bracket slidably and rotatably mounted adjacent its central portion in each of said jaw means, means for detachably clamping each jaw means to the respective bracket and said bar, each bracket including end portions extending to opposite sides of and below said member and entering within the adjacent drain gutter of the vehicle roof, and hook means on each end of each bracket engaging about the etxerior of the drain gutter and clamping the ends of said brackets to the gutters for mounting said bar above and transversely of the vehicle roof; a pair of substantially identical signal lights mounted adjacent the opposite ends of said bar; each light comprising a base, a light transmitting dome on the base, a shaft journalled on the base and extending upwardly into the dome and downwardly into said bar, sprocket means on the lower end portion of said shaft within said bar, and a plurality of diversely facing lamp holders in said dome detachably mounted on the upper end portion of said shaft; motor means in one of said lights drivingly connected to the shaft therein; chain means within the interior of said bar reaved over said sprocket means for imparting the movements of the motor driven shaft to the other of said shafts; a partition within said bar immediately below said sprocket means and said chain means to support said chain means and isolate the same from the remainder of the interior of said bar; and power supply means extending through said bar below said partition and upwardly through the bases of said lights outwardly of said sprocket means for supplying power to the lamps in each light and the motor in said one light.

10. Signal light means as set forth in claim 9 including an accessory device mounted on said bar centrally between said lights, and power supply means for said accessory device extending through said bar below said partition.

References Cited by the Examiner

UNITED STATES PATENTS

| | | | |
|---|---|---|---|
| 2,138,076 | 11/1938 | Taylor et al. | 240—41 |
| 2,235,012 | 3/1941 | Colvin | 224—42 |
| 2,584,292 | 2/1952 | Rogers | 340—87 |
| 2,738,492 | 3/1956 | Arneson | 340—87 |
| 2,826,682 | 3/1958 | Falge | 240—41 |
| 2,894,325 | 7/1959 | Flatland | 32—27 |
| 3,094,005 | 6/1963 | Pressler | 74—15 |
| 3,109,569 | 11/1963 | Hare | 224—42 |
| 3,117,302 | 1/1964 | Cardarelli et al. | 340—50 |

NEIL C. READ, *Primary Examiner.*

A. J. KASPER, *Assistant Examiner.*